United States Patent [19]

Busch et al.

[11] 3,974,473
[45] Aug. 10, 1976

[54] CABLE FOR MULTIPLE SONAR SYSTEMS

[75] Inventors: Carl Wilheim Busch, Bremen; Wolfgang Stedtnitz, Neukrug, both of Germany

[73] Assignee: Fried. Krupp Gesellschaft mit beschrankter Haftung, Essen, Germany

[22] Filed: Apr. 30, 1975

[21] Appl. No.: 573,092

[30] Foreign Application Priority Data

May 7, 1974   Germany............................ 2421878

[52] U.S. Cl.................................. 340/3 D; 174/34; 340/3 A
[51] Int. Cl.² ........................ G01S 7/52; G01S 9/68
[58] Field of Search.................... 340/3 A, 3 D, 3 R; 174/33, 34; 307/89; 333/12

[56] References Cited
UNITED STATES PATENTS

| | | | |
|---|---|---|---|
| 3,441,654 | 4/1969 | Nordblad............................ | 174/33 |
| 3,691,513 | 9/1972 | Stedtnitz............................ | 340/3 D |
| 3,821,465 | 6/1974 | Karlstedt............................. | 174/34 |

Primary Examiner—Richard A. Farley
Attorney, Agent, or Firm—Spencer & Kaye

[57] ABSTRACT

In a system composed of a plurality of sonar devices mounted on a ship and arranged to operate simultaneously, each device being composed of two units between which electrical signals pass during operation of the device and conductors connected for conveying such signals between the units, the conductors for all of the devices are constituted by a plurality of multiconductor cores, at least one core being associated with each device, and all of the cores are twisted together to form a common spiral multicore cable, whereby the spiral form of the cable produces a low level of cross-talk between the signals in different ones of the cores.

13 Claims, 5 Drawing Figures 3,974,473

CABLE FOR MULTIPLE SONAR SYSTEMS

BACKGROUND OF THE INVENTION

The present invention relates to an apparatus for simultaneously operating a plurality of different sonar systems on a ship, particularly a large ship.

Such sonar systems include echo sounders and Doppler recorders and are used particularly on large ships, such as tankers, container ships and freighters. They are composed of a plurality of units, i.e. acoustic transducers disposed below the water level and electronic devices installed within the ship, e.g. on the bridge. These units may be arranged, for example, 50 to 500 m apart from one another, one unit being at the bow and the other unit being at the stern. Electrical conductors are thus required to connect these units, which are part of the same system.

It is known, and customary to use one or a plurality of coaxial cables as the connecting elements for each of the installed units. Such cables when used in ships and particularly tankers, must also meet strict requirements imposed by the classification societies, since the ship's safety must be assured. Such societies are, for example, the Germanischer Lloyd or Det Norske Veritas.

As a result, it is necessary to incur high costs, which include the costs for material, i.e. for the cable, which is expensive because of the structural specifications required to meet the above-mentioned safety conditions. Furthermore, the high costs include the labor costs incurred during the installation and connection of these cables. These expenditures and labor costs far exceed the material costs. In order to reduce the labor costs it is known to encase a plurality of coaxial cables in one sheath. The thus resulting special cables are also expensive due to their limited field of application and the large amount of copper required for their shielding.

SUMMARY OF THE INVENTION

It is an object of the present invention to avoid, or at least substantially reduce, the costs involved in connecting spatially widely separated individual units of a sonar system on large ships and nevertheless provide for simultaneous operation of this system without mutual interference between units.

This is accomplished by the present invention in that a common multicore, or multiconductor, or multicord, cable is used for a plurality of systems, cores, or cords, of the cable being twisted in a spiral manner according to conventional and inexpensive machine implemented procedures, this type of twisting simultaneously providing sufficient freedom from interference, e.g. cross-talk in a suitable connection.

In particular, the present invention provides a cable of spiral wound quad elements, one spiral quad cable being associated with the Doppler transmitting transducer, a second spiral quad cable being associated with the Doppler receiving transducer and a two-wire line being associated with the echo sounder.

In further accordance with the concepts of the present invention, the transmitted energy is coupled symmetrically to the cable in the form of a two-phase signal with a phase shift of ±90° between phases and is converted to three-phase in a Scott transformer. In one embodiment the received energy is converted by a three-phase converter via a Scott transformer into a symmetrical two-phase signal. This is transmitted by two diametrically oppositely disposed conductors of the spiral quad cable.

According to the present invention, the Scott transformer is part of a bandpass filter. It has such electrical dimensions that its natural inductance tunes out the shunt capacitance of the transducer and the cable capacitance. The impedance of the transducer is matched to the characteristic impedance of the cable. Finally the width of the filter pass band is optimally adapted to the transducer bandwidth.

According to a further embodiment of the invention, an amplifier is connected between the receiving transducer and the Scott transformer, at one side, and the cable, at the other side. In another embodiment an amplifier is connected between the receiving transducer and the Scott transformer together with the cable.

When the system includes a preamplifier, the direct voltage therefor is transmitted, according to the present invention, in a phantom circuit via the transmitting spiral quad cable.

In another embodiment, the transmitter and receiver outputs are each transmitted in the form of a three-phase signal in a spiral quad cable with or without a continuous neutral, or common, conductor.

According to a further embodiment, the transmitting generator is matched to the spiral twisted quad cable only with regard to its fundamental frequency component by means of a bandpass filter in the form of a Scott transformer.

The advantages obtained with the present invention reside in the high cross-talk attenuation between transmitter and receiver in the Doppler system, on the one hand, and between the Doppler system and the echo sounder, and vice versa, as well as in an improvement of the signal to noise ratio in the receiving channels of the simultaneously operated instruments in spite of the use of but a single multiple core cable.

The electrical cross-talk attenuation required during operation between different instruments lies approximately in the range between 130 to 150 dB. However, due to operation at different frequencies during transmission of the transmitted and received signals in the same cable, these values cannot be attained because, on the one hand, the required filters would be very expensive and complicated and, on the other hand, the transmitting spectra would never reach such high attenuation values. The cable operated according to the present invention permits cross-talk attenuations of about 80 dB between pairs of lines in a cable of 400 m length. This value is already sufficient for operation of the transmitting and receiving channel of the Doppler device per se. For the simultaneous operation of an echo sounder it is now sufficient if an additional filter attenuation of 50 to 70 dB can be attained by frequency shifting, which can be realized with little cost.

The use of but a single cable on large ships has great economic advantages. The installation costs are calculated per meter of cable installed and are about 3 to 4 times the cost of the material. A cable with many cores according to the invention requires no higher installation costs than a simple coaxial cable.

DESCRIPTION OF THE PREFERRED EMBODIMENTS

Figure 1:
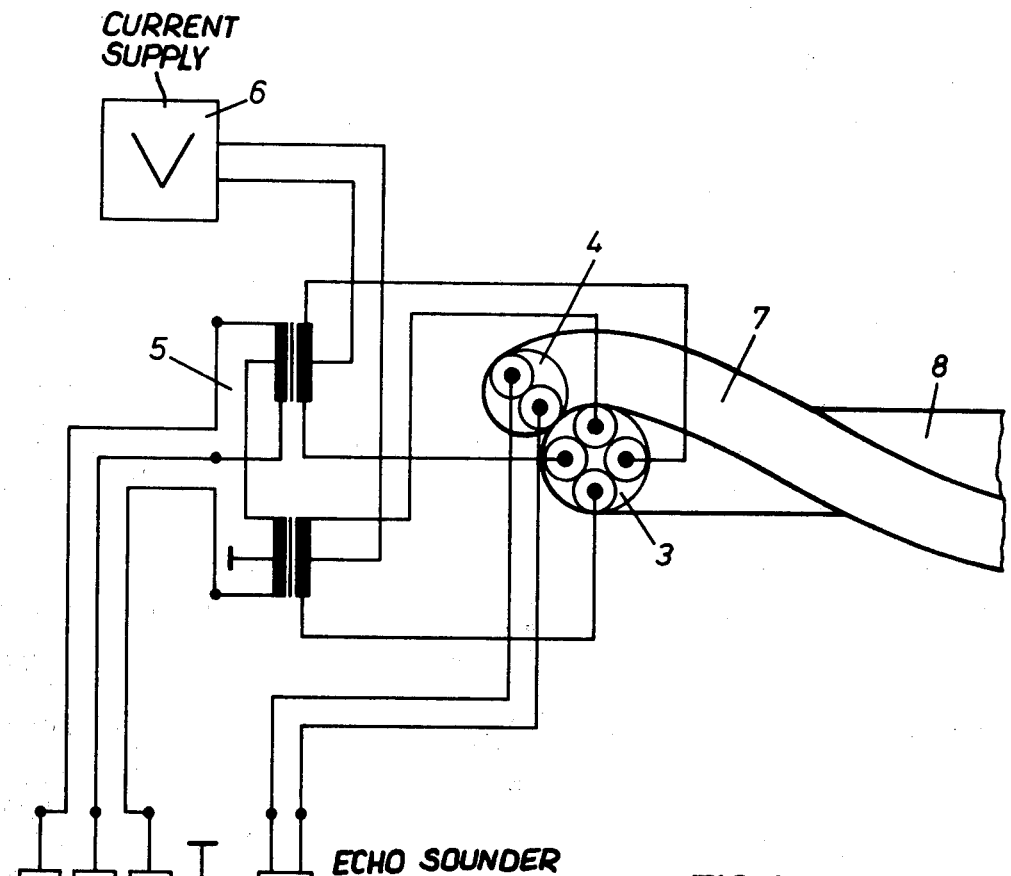
FIG. 1 is a simplified circuit diagram of a Doppler tranmitting transducer connected to a spiral quad cable and an echo sounder which is connected to a two-wire line, according to the invention.

In the circuit arrangement shown in FIG. 1, a Doppler sonar transmitting transducer 1 is connected to a Scott transformer 5. The latter converts the three-phase output voltage of the Doppler transmitting transducer 1 into two single-phase voltages, each of which is conducted to a respective pair of diametrically opposed conductors of a spiral wound quad cable 3. Twisted together with the spiral quad cable 3 is a two-wire line cable 4. The two outputs of an echo sounder 2 are connected to the wires of cable 4. The common twist of the spiral quad cable 3 with the two-wire cable 4 is indicated at 7 and 8. The output of a current supply 6 is fed into the Scott transformer in the manner indicated. Instead of the two-wire line it is also possible to employ a pair of conductors of a further quad cable.

Figure 5:
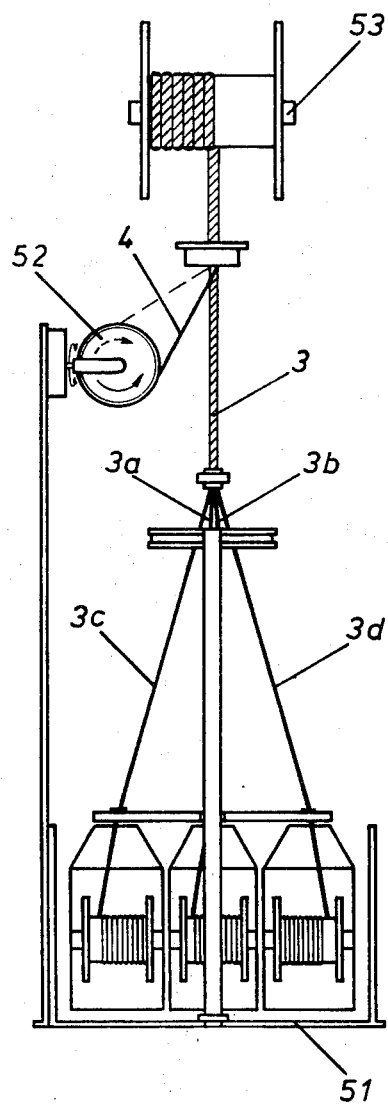
FIG. 5 is a schematic sketch of a quad stranding machine.

The cable 4 being a two-wire spiral type cable is twisted by itself and then stranded over the quad 3 as demonstrated in FIG. 5. FIG. 5 shows a quad stranding machine as for instance manufactured by Krupp Rheinhausen Germany. The four insulated wires 3 a, 3 b, 3 c and 3 d are on their reels put into the cradles of the stranding head 51 of the mechine and another cradle 52 is provided for cable 4. So the combination of cable 3 and 4 is taken up on the reel 53. The pitch of the stranding would be by the order of 110 to 120 mm.

Figure 2:
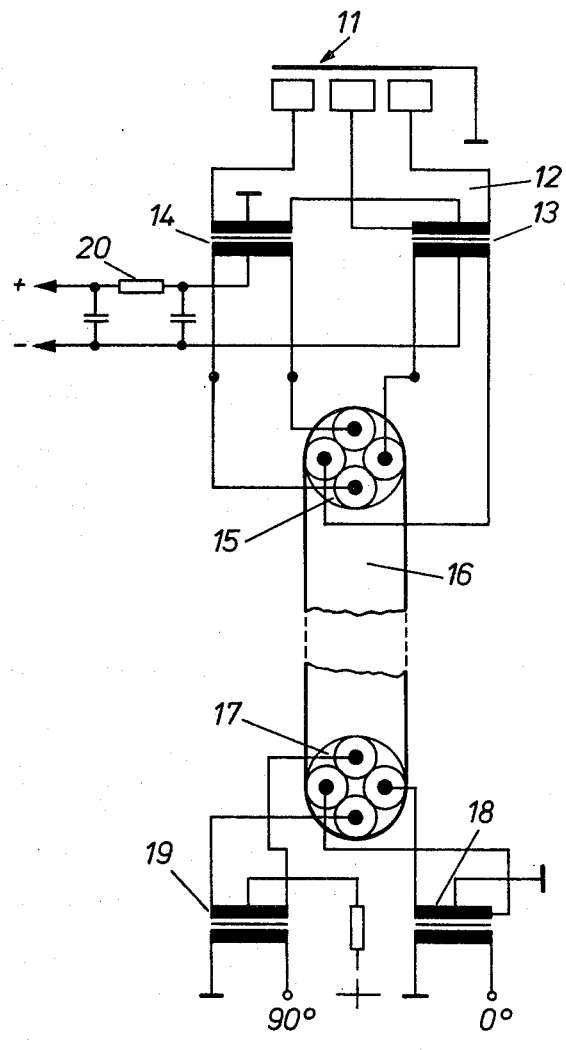
FIG. 2 is a similar view showing the transmission for a preamplifier via the transmitting spiral quad cable arranged in a phantom connection.

FIG. 2 shows the use of a Doppler transmitting transducer 11 with a Scott transformer 12. The output transformers 13 and 14 of the Scott transformer 12 are each connected to a respective diametrically opposed pair of conductors of a spiral quad cable 15, which conductors lead as cable 16 to an output quad cable 17. The same conductors are connected to the secondaries of transformers 18 and 19. The primaries of transformers 18 and 19 are connected to the respective phases of a two-phase signal source, the phases being 90° apart. The transmitting signal, or energy, is thus symmetrically coupled into the cable with a shift of 90° between signal phases and then converted to three phases by the Scott transformer 12. A lowpass filter 20 feeds supply current symmetrically into the cable in a phantom connection.

Figure 3:
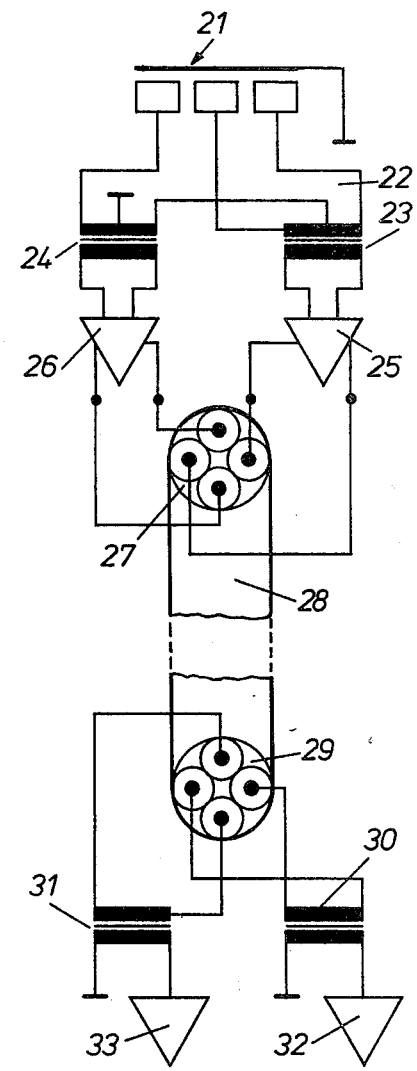
FIG. 3 is a similar view showing the connection of amplifiers between a receiving transducer and a Scott transformer, on the one hand, and the cable, on the other hand.

FIG. 3 shows a Doppler receiving transducer 21 which is connected to a Scott transformer 22. The two single-phase outputs 23 and 24 of the transformer 22, however, are connected to amplifiers 25 and 26. The signals obtained at the outputs of these amplifiers are connected to a respective diametrically opposed pair of conductors of a spiral quad cable 27. The spiral quad cable 27 is continued within a sheath 28 to the output 29 of the spiral quad cable. Here the oppositely disposed conductors of the spiral quad cable 29 which correspond to the connections to amplifiers 25 and 26 are connected to output transformers 30 and 31, respectively, and from the secondaries of transformers 30 and 31 the output signals are fed to amplifiers 32 and 33.

Transducer 1 of FIG. 2 can be a transmitting or a receiving transducer. So the system would have a separate transmitting and receiving transducer in quite the same arrangement. Transducer 11 and 21 have nothing to do with each other.

Figure 4:
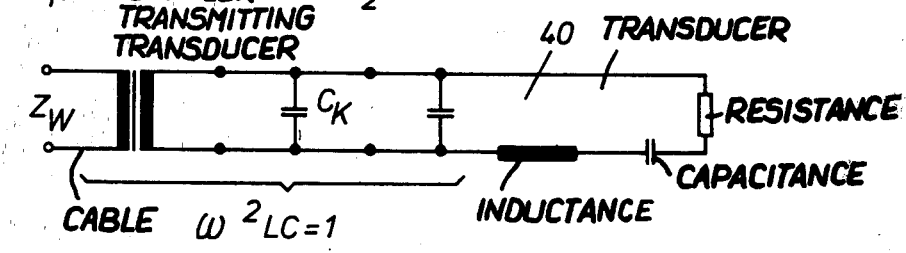
FIG. 4 is a schematic diagram illustrating the matching of the transmitting generator to the cable with a spiral twisted quad cable where only the fundamental wave is matched via a bandpass filter in the form of a Scott transformer.

FIG. 4 shows how a Scott transformer forming part of a bandpass filter 40 is dimensioned so that its natural inductance tunes out the transducer capacitance as well as the cable capacitance $C_k$, and the impedance of the transducer is matched to the characteristic impedance $Z_w$ of the second cable, the bandwidth being optimally adapted to the bandwidth of the transducer.

FIG. 4 shows the impedance $Z_w$ of the cable connected through a Scott transformer of the transducer 40 having an inductance, a capitance and a resistance as given in the "Data Book for Designers" of Brush Clevite in 1966.

The application is disclosing the embodiments of all the components of sonar. Those are for instance also disclosed in Robert V. Urick "Principles of underwater sound" in Mac Graw Hill Book Company 1967, page 7/12.

It will be understood that the above description of the present invention is susceptible to various modifications, changes and adaptations, and the same are intended to be comprehended within the meaning and range of equivalents of the appended claims.

What is claimed is:

1. In a system composed of a plurality of sonar devices mounted on a ship and arranged to operate simultaneously, each device being composed of two units between which electrical signals pass during operation of the device and conducting means connected for conveying such signals between the units, the improvement wherein, for all of said devices, said conducting means comprise plurality of multiconductor cores, at least one core being associated with each said device, with all of said cores being twisted together to form a common spiral multicore cable, whereby the spiral form of said cable produces a low level of interference between the signals in different ones of said cores.

2. An arrangement as defined in claim 1 wherein one unit of a first one of said devices comprises a Doppler transmitting transducer, one unit of a second one of said devices is an echo sounder, one of said cores associated with said first device is constituted by a spiral quad twisted cable and one of said cores associated with said second device is constituted by a two-wire line.

3. An arrangement as defined in claim 2 wherein said one unit of said first device further includes a Scott transformer connected to convert two-phase power at its primary into three-phase power at its secondary and having its primary connected to said spiral quad cable and its secondary connected to said transmitting transducer, the other unit of said first device includes a two-phase power generator connected to supply each phase of its output to a respective diametrically opposed pair of conductors of said spiral quad twisted cable.

4. An arrangement as defined in claim 3 wherein said Doppler transducer also acts to receive reflected sound waves and to produce a three-phase electrical output, and said transducer is connected to said Scott transformer, whereby three-phase signals at the secondary of said transformer are converted into symmetrical two-phase signals at its primary.

5. An arrangement as defined in claim 3 wherein the other unit of said first device comprises a transmitter signal generator and a bandpass filter connected between said generator and said spiral quad cable for matching the fundamental frequency component of said generator to said spiral quad cable.

6. An arrangement as defined in claim 4 wherein said secondary of said Scott transformer is connected to said spiral quad cable in such a manner that each phase of the two-phase signals is applied to a respective diametrically opposed pair of conductors of said quad cable.

7. An arrangement as defined in claim 6 further comprising means connected to said Scott transformer and forming a bandpass filter therewith.

8. An arrangement as defined in claim 7 wherein the inductance of said Scott transformer is given a value which tunes out the shunt capacitance of said transducer and the capacitance of said cable, the impedance of said transducer is matched to the characteristic impedance of a second cable, and the bandwidth of said filter is matched to that of said transducer.

9. An arrangement as defined in claim 2 further comprising means forming a phantom connection connected to said spiral quad cable for supplying a d.c. supply voltage for a preamplifier.

10. An arrangement as defined in claim 2 wherein said transducer is of the type which operates with three-phase signals and said spiral quad cable is connected to conduct the three-phases of the transducer signal without a neutral conductor.

11. An arrangement as defined in claim 2 wherein said transducer is of the type which operates with three-phase signals and said spiral quad cable is connected to conduct the three phases of the transducer signal on respective ones of three of the four conductors of said quad cable, and the fourth conductor of said quad cable is a neutral conductor for all three phases.

12. An arrangement as defined in claim 1 wherein: one unit of a first one of said devices comprises a Doppler receiving transducer producing a three-phase output, a Scott transformer connected to said transducer for converting such three-phase output into a two-phase output, and two amplifiers each connected to said transformer to receive a respective phase of such output; and one of said cores associated with said first device is constituted by a spiral quad twisted cable whose conductors are connected to the outputs of said amplifiers.

13. An arrangement as defined in claim 1 wherein: one unit of a first one of said devices comprises a Doppler receiving transducer producing a three-phase output, a Scott transformer connected to said transducer for converting such three-phase output into a two-phase output, and amplifier means connected between said transducer and said transformer; and one of said cores associated with said first device is constituted by a spiral quad twisted cable whose conductors are connected to the outputs of said transformer.

* * * * *